United States Patent
Desai et al.

(10) Patent No.: US 12,520,161 B2
(45) Date of Patent: Jan. 6, 2026

(54) POWER-BASED CHANNEL ASSIGNMENTS FOR OVERLAPPING ACCESS POINTS

(71) Applicant: Cisco Technology, Inc., San Jose, CA (US)

(72) Inventors: Vishal Satyendra Desai, San Jose, CA (US); Peiman Amini, Fremont, CA (US); Ardalan Alizadeh, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 275 days.

(21) Appl. No.: 18/108,236

(22) Filed: Feb. 10, 2023

(65) Prior Publication Data
US 2024/0276229 A1    Aug. 15, 2024

(51) Int. Cl.
*H04W 16/02* (2009.01)
*H04W 52/38* (2009.01)

(52) U.S. Cl.
CPC .......... *H04W 16/02* (2013.01); *H04W 52/38* (2013.01)

(58) Field of Classification Search
CPC . H04W 52/38; H04W 16/02; H04W 74/0808; H04W 16/14; H04W 52/34; H04W 72/02; H04W 52/243; H04W 72/0453; H04W 72/23; H04L 1/20; H04L 5/001; H04L 5/0048
See application file for complete search history.

(56) References Cited

U.S. PATENT DOCUMENTS

| | | | |
|---|---|---|---|
| 8,599,744 B2 | 12/2013 | Lee et al. | |
| 8,861,452 B2 * | 10/2014 | Barbieri | H04W 48/10 370/329 |
| 8,903,448 B2 * | 12/2014 | Chande | H04W 52/34 370/332 |
| 9,161,357 B2 * | 10/2015 | Horn | H04W 28/18 |
| 9,391,849 B2 | 7/2016 | Abraham et al. | |
| 9,668,088 B2 * | 5/2017 | Quinn | H04W 16/14 |
| 9,674,744 B2 * | 6/2017 | Xue | H04W 28/20 |
| 10,958,555 B2 | 3/2021 | Kumar et al. | |

(Continued)

FOREIGN PATENT DOCUMENTS

WO    2022073576    4/2022

OTHER PUBLICATIONS

Desai, et al., "Automated Frequency Coordination Guided Radio Assignment for WiFi 6E Access Points", Technical Disclosure Commons, (Jul. 8, 2021), 5 pages, Creative Commons.

(Continued)

*Primary Examiner* — Jung Liu
(74) *Attorney, Agent, or Firm* — Lee & Hayes, P.C.

(57) ABSTRACT

According to one or more embodiments of the disclosure, an example process herein may comprise: detecting overlapping coverage among a set of access points; identifying a permissible set of channels for each access point of the set of access points based at least in part on power characteristics associated with each access point of the set of access points; determining a level of modal commonality with neighboring access points for each access point of the set of access points; and assigning a channel to each access point of the set of access points based on the permissible set of channels and the level of modal commonality with neighboring access points for that access point.

20 Claims, 7 Drawing Sheets

(56) References Cited

U.S. PATENT DOCUMENTS

| | | | | |
|---|---|---|---|---|
| 11,234,254 | B2* | 1/2022 | Hareuveni | H04W 72/0453 |
| 11,720,074 | B2* | 8/2023 | Krishnan | G05B 19/41835 |
| | | | | 700/275 |
| 11,775,132 | B1* | 10/2023 | McDannald | G06F 3/04815 |
| | | | | 715/741 |
| 11,782,410 | B2* | 10/2023 | Krishnan | G05B 19/0423 |
| | | | | 700/275 |
| 11,843,475 | B2* | 12/2023 | Marti | H04L 12/281 |
| 12,107,789 | B2* | 10/2024 | Sverdlov | H04L 5/001 |
| 2015/0312891 | A1* | 10/2015 | Quinn | H04W 4/02 |
| | | | | 455/452.1 |
| 2016/0313904 | A1* | 10/2016 | Ahn | G06F 3/04817 |
| 2017/0086112 | A1* | 3/2017 | Xue | H04B 17/382 |
| 2019/0373308 | A1* | 12/2019 | Skupin | H04L 67/02 |
| 2021/0120556 | A1* | 4/2021 | Segev | H04W 28/16 |
| 2021/0204302 | A1* | 7/2021 | Hareuveni | H04W 72/23 |
| 2021/0273870 | A1 | 9/2021 | Xiao et al. | |
| 2023/0284063 | A1* | 9/2023 | Kaliaperumal | H04W 16/14 |
| | | | | 370/329 |
| 2023/0350372 | A1* | 11/2023 | Krishnan | G05B 19/0421 |
| 2024/0107568 | A1* | 3/2024 | Bandaru | H04L 5/0092 |
| 2024/0196384 | A1* | 6/2024 | Clancy | H04W 72/0453 |
| 2024/0349067 | A1* | 10/2024 | Srinivasan | H04W 72/02 |
| 2024/0373239 | A1* | 11/2024 | Furuichi | H04L 1/20 |

OTHER PUBLICATIONS

Sheriff, et al., "Efficiently Allocating Radio Resources in the Downlink Direction to Meet Quality of Service Requirements of 5G Wireless Networks", Technical Disclosure Commons, ( Jun. 26, 2018), 8 pages, Creative Commons.

Taneja, et al., "Resource Allocation in 802.11AX Networks", Technical Disclosure Commons, (Jun. 22, 2018), 37 pages, Creative Commons.

"The Commission Begins the Process for Authorizing 6 GHz Band Automated Frequency Coordination Systems", FCC Fact Sheet, Public Notice—ET Docket No., 21-352, Sep. 9, 2021, 7 pages, Federal Communications Commission.

"Meraki Auto RF: Wi-Fi Channel and Power Management", online: https://documentation.meraki.com/MR/Monitoring_and_Reporting/Location_Analytics/Meraki_Auto_RF%3A_Wi-Fi_Channel_and_Power_Management, Nov. 2022, accessed Jan. 25, 2023, 13 pages, Cisco Systems, Inc.

Gong, et al., "An efficient genetic algorithm for large-scale transmit power control of dense industrial wireless networks", online: https://arxiv.org/ftp/arxiv/papers/1709/1709.04320.pdf, Aug. 2017, 29 pages, ArXiv.

Madanapalli, et al., "Assisting Delay and Bandwidth Sensitive Applications in a Self-Driving Network", NetAI '19, Aug. 23, 2019, 6 pages, Beijing, China, Association for Computing Machinery.

\* cited by examiner

POWER-BASED CHANNEL ASSIGNMENTS FOR OVERLAPPING ACCESS POINTS

TECHNICAL FIELD

The present disclosure relates generally to power-based channel assignments for overlapping access points.

BACKGROUND

As adoption and deployment of wireless data communication devices has expanded, the capacity of legacy wireless connectivity technology to serve these devices has been overwhelmed. For example, Wi-Fi communication channels in the 2.4 GHZ band and the 5 GHz band commonly suffer from congestion with too many access points and clients sharing the same channel, especially in areas of dense deployment. In response, the 6 GHz band has been opened for Wi-Fi use.

The 6 GHz band represents 1200 MHz of spectrum available from 5.925 GHz to 7.125 GHz providing access to fifty-nine 20-MHz channels, twenty-nine 40-MHZ channels, fourteen 80-MHz channels, and seven 160-MHz channels. Operated according to the IEEE 802.11ax standard and marketed as Wi-Fi 6E, this expansion of Wi-Fi spectrum offers an enhancement in throughput-per-area over the legacy spectrum.

Given the need to preserve the access of incumbent users to this portion of the spectrum, conditional operating restrictions apply to devices using this portion of the spectrum for Wi-Fi communications. To comport with these restrictions, access points are configured to operate in various power modes. For example, standard power (SP) access points can operate in only a portion of the 6 GHz band indoors or outdoors at full power, while low power indoor (LPI) access points are able to operate across the entire the 6 GHz band at a lower port and only indoors.

In some deployments both SP access points and LPI access points may be collocated. In such deployments, the maximum transmit power allowance of collocated access points are not homogenous. This can prevent full utilization of the 6 GHz band capacity due to interference among SP access points and LPI access points.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device may detect overlapping coverage among a set of access points; identify a permissible set of channels for each access point of the set of access points based at least in part on power characteristics associated with each access point of the set of access points; determine a level of modal commonality with neighboring access points for each access point of the set of access points; and assign a channel to each access point of the set of access points based on the permissible set of channels and the level of modal commonality with neighboring access points for that access point.

Other embodiments of the present disclosure may be discussed in the detailed description below, and the summary above is not meant to be limiting to the scope of the invention herein.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
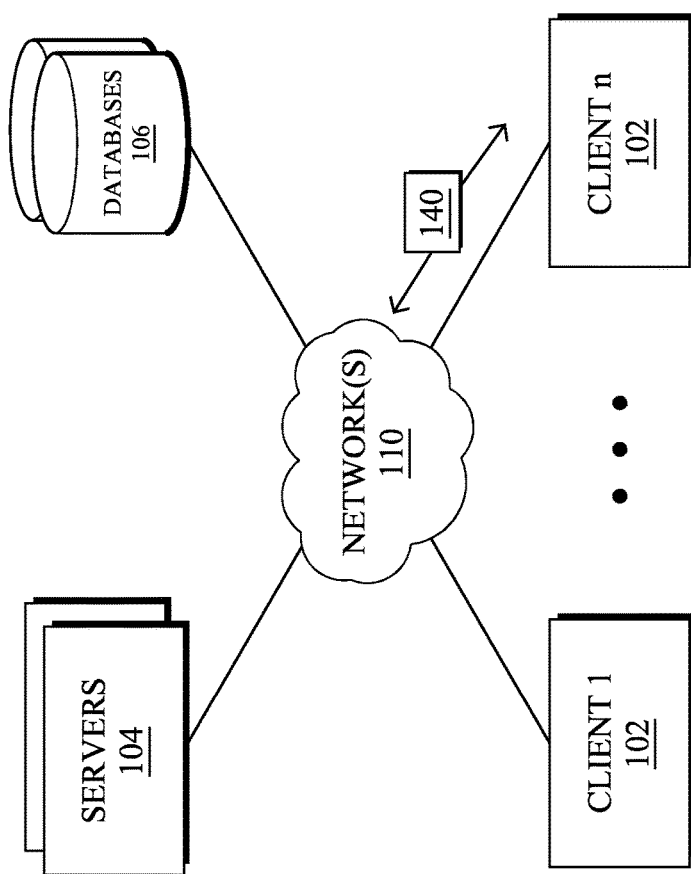
FIG. 1 illustrates an example computer network.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
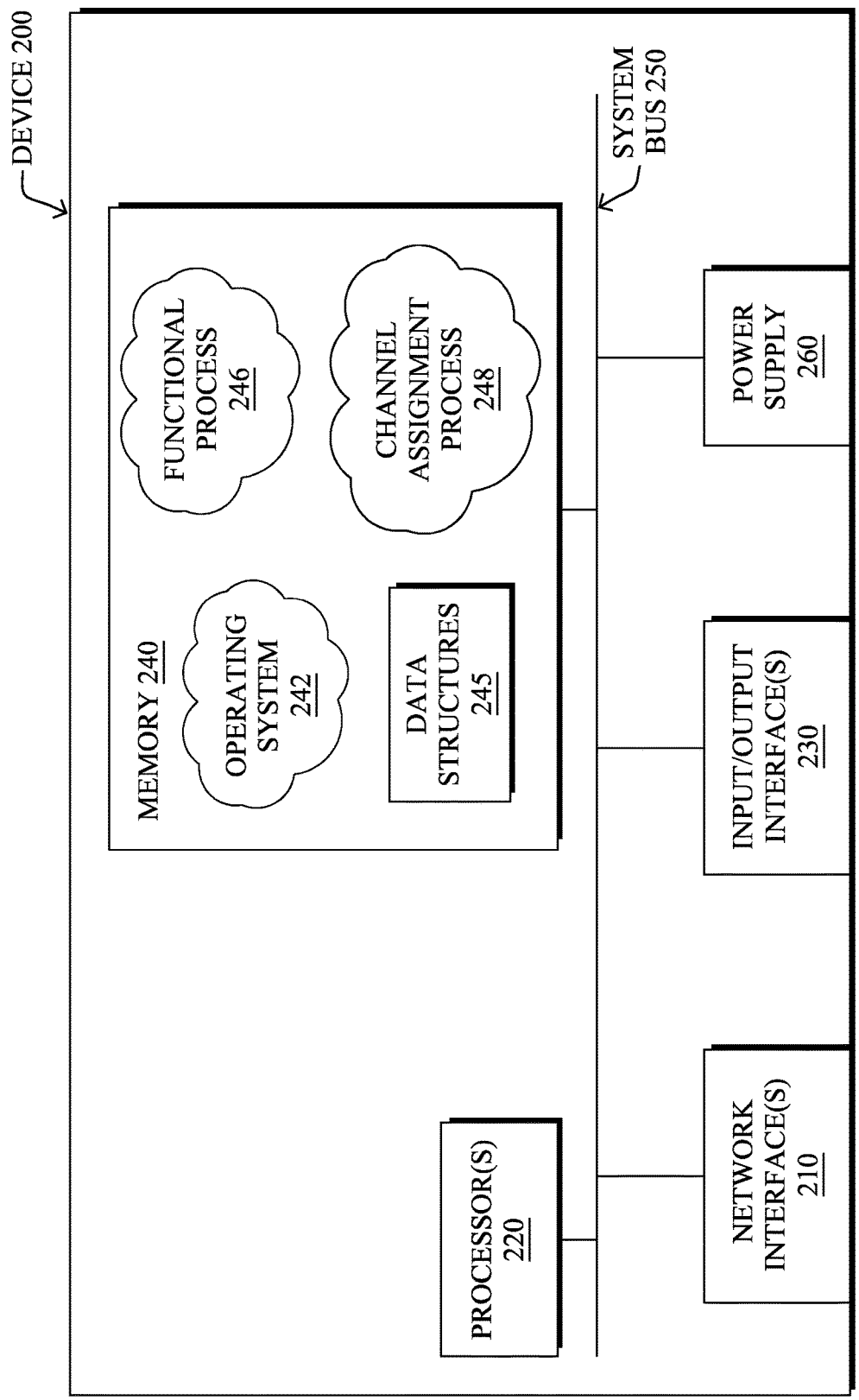
FIG. 2 illustrates an example computing device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, channel assignment process 248, as described herein. Notably, the one or more functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 3:
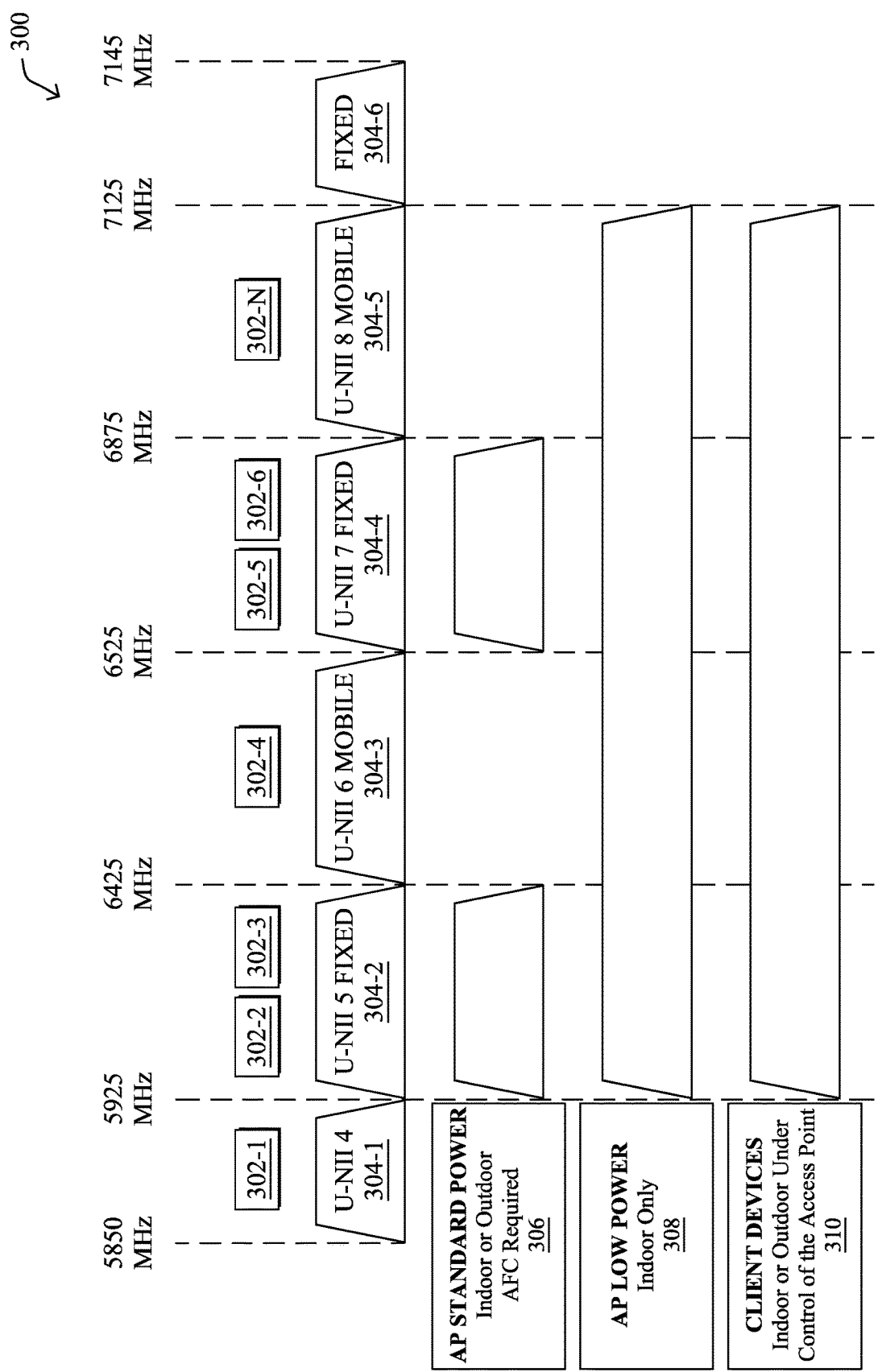
FIG. 3 illustrates an example of a band segmentation of the 6 GHz band for Wi-Fi use.

FIG. 3 illustrates an example of a band segmentation 300 of the 6 GHz band for Wi-Fi use, according to various embodiments. As previously noted, regulatory agencies have established rules regarding operation of unlicensed devices, like Wi-Fi devices, on the 6 GHz band. These rules are largely in place to preserve access to the band by incumbent users 302 (e.g., 302-1 . . . 302-N).

The 6 GHz band is itself segmented into bands 304 (e.g., 304-1 . . . 304-6). The bands 304 include a variety of unlicensed national information infrastructure (U-NII) bands. These bands 304 may correspond to use by incumbent users 302. For example, U-NII 5 band 304-2, including the portion of the 6 GHz band running from 5925 MHz to 6425 MHz, and U-NII 7 band 304-4, including the portion of the 6 GHz band running from 6525 MHz to 6875 MHz, are primarily used for fixed service incumbents. For instance, U-NII 5 band 304-2 and U-NII 7 band 304-4 are utilized by satellite link communications to geostationary satellites, point-to-point microwave links deployed by carriers for wireless backhaul, and/or critical services like utilities, as well as public safety and emergency services. U-NII 6 band 304-3, including the portion of the 6 GHz band running from 6425 MHz to 6525 MHZ, and U-NII 8 band 304-5, including the portion of the 6 GHz band running from 6875 MHz to 7125 MHz, are primarily used for mobile service incumbents, such as mobile trucks used by the news crews to relay the signal back to the TV studio.

Incumbent users 302 may represent critical users, and therefore the rules of operation defined by regulators for unlicensed devices serve to ensure that these devices do not produce harmful interference to incumbent users 302. These rules limit how unlicensed devices such as access points and their clients can utilize the 6 GHz band. This has resulted in various classes of access points being defined to adapt to the U-NII bands and conditions where they will be operating. These classes correspond to power modes (e.g., standard, low, very low, etc.) by which the access points operation. The classes include the standard power access points (e.g., SP access points 306), the low power indoor access points (e.g., LPI access points 308), and very low power (VLP) access points.

SP access points 306 are permitted to operate in the U-NII 5 and U-NII 7 bands indoors or outdoors at full power. SP access points 306 are required to operate under the control of an automated frequency coordination (AFC) system. The AFC system may assign a list of frequencies to an access point, based on where it can operate safely without interfering with any incumbent fixed microwave receiver.

Conversely, LPI access points 308 may operate across the entire 6 GHz band (U-NII 5, U-NII 6, U-NII 7 and U-NII 8) for indoor operation only, and without the need of AFC. Client devices 310 don't need to utilize the AFC system since they have to follow the access point that they're connected to and the access point itself is operating under AFC. To ensure that LPI access points 308 remain indoors, these devices may not have weather resistant enclosures, may not operate on battery power, and/or may have integrated antennas with a design that prevents the installation of external antennas.

Figure 4:
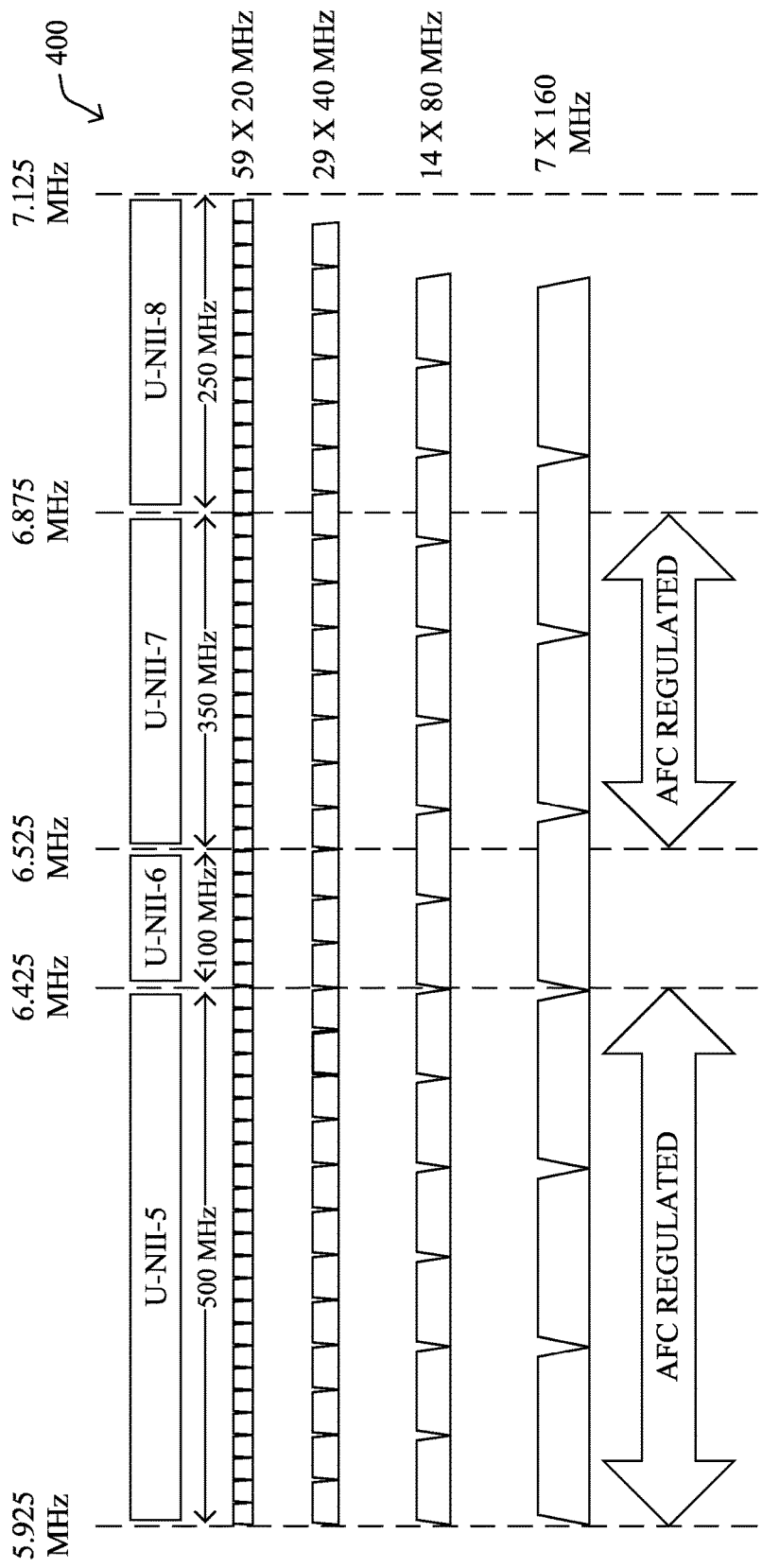
FIG. 4 illustrates an example of a channel segmentation of the 6 GHz band for Wi-Fi use.

FIG. 4 illustrates an example of a channel segmentation 400 of the 6 GHz band for Wi-Fi use, according to various embodiments. The channel segmentation 400 of the 6 GHz band provides fifty-nine 20-MHz channels, twenty-nine 40-MHz channels, fourteen 80-MHz channels, and/or seven 160-MHz channels. LPI access points 308 have access to fifty-nine allowed channels while SP access points 306 have access to forty-two allowed channels.

SP access points 306 may operate with a maximum effective isotropic radiated power (EIRP) of 36 dBm or maximum spectrum density of 23 dBm/MHz. This power class may ensure that the 20 MHz channels have the highest power spectral density (PSD). Conversely, LPI access points 308 may have a maximum allowed EIRP of 30 dBm or 5 dBm/MHz PSD. Unlike SP access points 306, the power rules for LPI access points 308 provide wider channel deployments, where the highest power is being achieved.

Table I further illustrates these power budget differences.

TABLE I

EXPANDED UNLICENSED USE OF THE 6 GHz BAND:

| DEVICE CLASS | OPERATING BANDS | MAXIMUM EIRP | MAXIMUM EIRP POWER SPECTRAL DENSITY |
|---|---|---|---|
| Standard Power Access Point (AFC Controlled) | U-NII-5 U-NII-7 | 36 dBm | 23 dBm/MHz |
| Fixed Client (AFC Controlled) | | 36 dBm | 23 dBm/MHz |
| Client Connected to Standard Power Access Point | | 30 dBm | 17 dBm/MHz |
| Low Power Access Point (Indoor Only) | U-NII-5 U-NII-6 | 30 dBm | 5 dBm/MHz |
| Client Connected to Low Power Access Point | U-NII-7 U-NII-8 | 24 dBm | −1 dBm/MHz |

As is evident by Table I, the power budget differences between SP access points 306 and LPI access points 308 are quite significant. While LPI access points 308 limitations are enforced on the indoors integrated antenna units, SP access points 306 operations are mandated on the external antenna units along with the outdoor access points.

Figure 5:
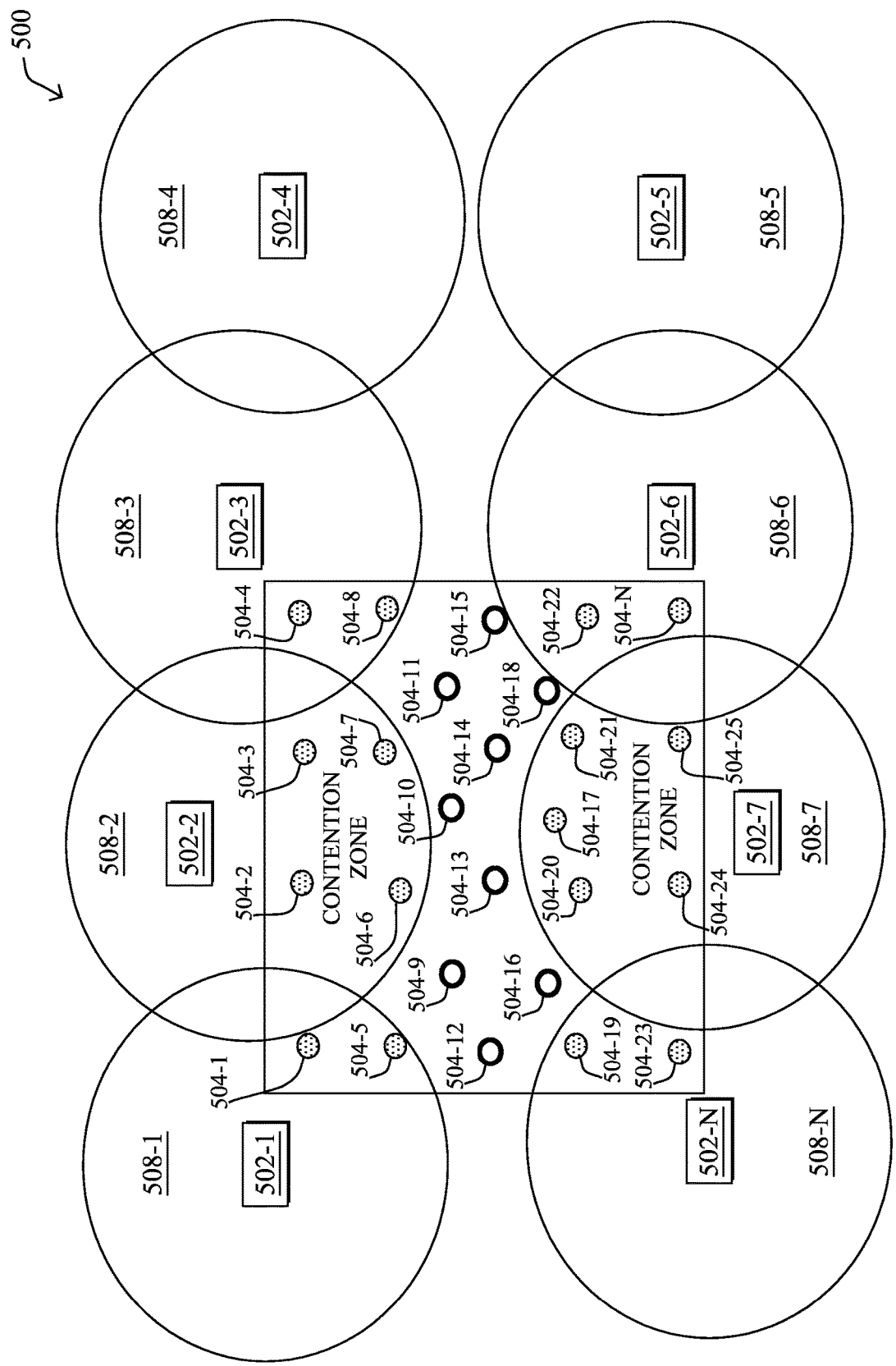
FIG. 5 illustrates an example of a deployment of collocated access points operating on the 6 GHz band in mixed power modes.

FIG. 5 illustrates an example of a deployment 500 of collocated access points operating on the 6 GHz band in mixed power modes, according to various embodiments. Deployment 500 may be an Internet of things (IoT) deployment including outdoor access points 502 (e.g., 502-1 . . . 502-N) operating in the standard power mode and indoor access points 504 (e.g., 504-1 . . . 504-N) which may be operating in standard power mode or low power indoor power mode. The indoor access points 504 may be located within a structure 506 such as a factory, a warehouse, a retail location, an airport, etc.

In deployment 500, the access points may have signal coverage cells 508 (e.g., 508-1 . . . 508-N). Typically, outdoor access points 502 operating in the standard power mode have a cell size that can be sixteen times that of indoor access points 504 operating in low power indoor power mode.

When outdoor access points 502 operating in the standard power mode and indoor access points 504 operating in low power indoor power mode are collocated in and around a structure 506, contention zones may exist where the signal coverage cells 508 of outdoor access points 502 operating in the standard power mode are overlapping with the indoor access points 504 operating in low power indoor power mode. As a result, indoor access points 504 operating in low power indoor power mode may face substantial interference from the outdoor access points 502 operating in the standard power mode within these contention zones.

As noted above, deployments such as deployment 500 with multiple collocated access points operating in the 6 GHz band, with different cell sizes and power budgets may be a very common scenario. For example, in use cases such as factories, warehouses, retail locations, airports, etc. both integrated and external antenna units are commonly deployed and therefore we may encounter deployments that the maximum transmit power allowance of the access points are not homogenous.

Standard Power operations can create a significant impact on the adjacent indoor radios. This can potentially cause problem of not fully utilizing 6 GHz capability since there will be substantial interference from access points operating in a standard power mode to the access points operating in the low power indoor power mode. Unfortunately, there is currently no mechanism to provide a holistic channelization method that allows for mixed power mode operations of 6 GHz access points operating in IoT deployments.

Further, to enable AFC and to utilize 6 GHz band, the location of access points may need to be reported with accuracy to the AFC server. To achieve this requirement, multiple geolocation methods may be used. However, since the actual GPS signal reception (via Gypsum module or internal embedded GNSS) can be very weak, other methods to group access points based on some other factors such as maximum radius to switch as center may be utilized. Therefore, we can expect that in deployment that only some part of a deployment site (e.g., building) is inside the exclusive zone of incumbent receiver, and we have a group of access points with standard power granted and other groups only allowed to transmit in low power indoors.

Therefore, a class of access points utilizing the 6 GHz band that supports both access point stack and FM stack communications may be deployed. These access points may need to be managed by an AFC system for 6 GHz radio. The access point stack side may leverage a unified wireless solution architecture, such as using a wireless controller as a proxy (such as, e.g., a Catalyst 9800 Series Wireless Controller available from Cisco Systems, Inc., of San Jose, California). For the FM stack, a radio configuration system (such as, e.g., a Fluidmesh centralized Radio Configuration Environment or "RACER/Racer Cloud", also available from Cisco Systems, Inc.) may be utilized as the proxy. The wireless controller and radio configuration systems may request allowed frequencies and power budget for these access points and may support both low power and standard power operations. The ability of such multi-power mode access points to operate in a variety of power modes is currently not leveraged to orchestrate optimized channel use.

Power-Based Channel Assignments for Overlapping Access Points

The techniques herein, therefore, introduce a method that segments 6 GHz frequencies based on the proximity of these heterogeneous access points along with considerations from an AFC system to minimize frequent channel updates between bordering access points.

Specifically, according to one or more embodiments described herein, an example process herein may comprise: detecting overlapping coverage among a set of access points; identifying a permissible set of channels for each access point of the set of access points based at least in part on power characteristics associated with each access point of the set of access points; determining a level of modal commonality with neighboring access points for each access point of the set of access points; and assigning a channel to each access point of the set of access points based on the permissible set of channels and the level of modal commonality with neighboring access points for that access point.

Figure 6:
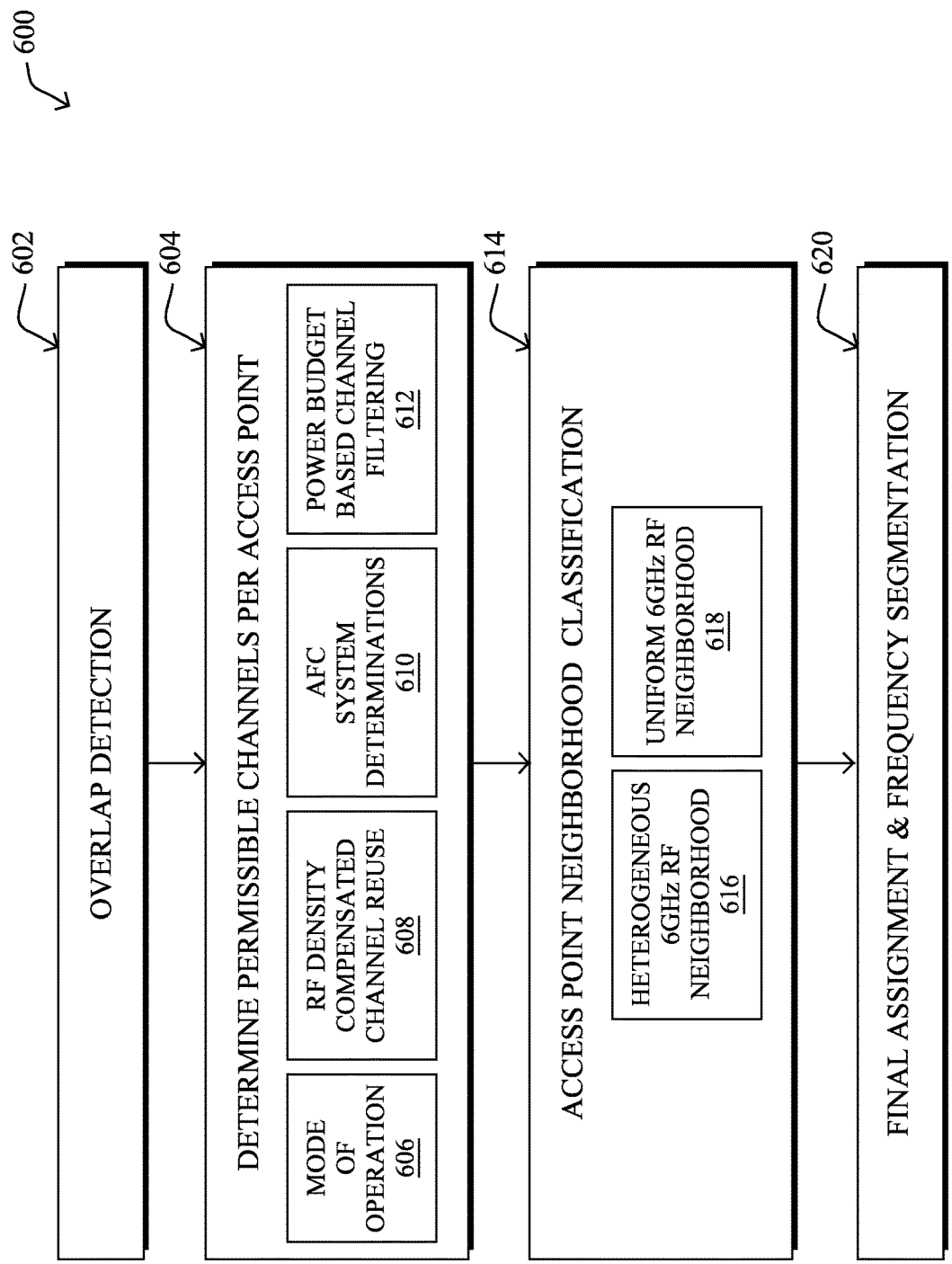
FIG. 6 illustrates an example of a process flow for power-based channel assignments for overlapping access points.

Operationally, FIG. 6 illustrates an example of a process flow 600 for power-based channel assignments for overlapping access points, according to various embodiments. Specifically, process flow 600 illustrates an example of steering logic for segmenting 6 GHz frequencies based on the proximity of heterogeneous access points along with considerations from an automated frequency coordination (AFC) system to minimize frequent channel updates between bordering access points.

When executed, process flow 600 may provide an AFC-aware channelization for collocated access points operating in different power modes, where overlap percentage between indoor and outdoor access points is detected in order to determine appropriate frequency segmentation between these different classes of devices. Process flow 600 may be partially or entirely executed by an access point, a network controller, and/or a computing device communicatively coupled to the access points receiving channel assignments, a network controller, and/or an AFC system database.

Process flow 600 may include performing overlap detection 602. Performing overlap detection 602 may include determining presence, location, capability, overlap, and/or radio frequency (RF) density information for collocated access points. For example, performing overlap detection 602 may include determining the presence of collocated LP access points and SP access points such as are depicted in FIG. 5.

The information to make the overlap determinations may be gathered from 802.11 beacon information transmitted by the access points. These beacon frames may advertise a power element and/or mode of operation (e.g., whether an access point is operating in low power mode or standard power mode).

In some instances, this information may be derived via a platform model of an access point. Further, an access point's product identifiers may also be used to determine its mode of operation and/or operational capabilities. IoT access points may be certified to either operate in indoor environments or in outdoor environments. Therefore, identifying the model and/or product identifier of an access point may be used to determine its certifications that may be revelatory of its mode of operation and/or operational capabilities. This information may be retrieved by a query of the access points and/or from its beacon frame.

In various embodiments, overlap detection 602 may be performed by a central processing system. For instance, a central processing system, such as in a radio configuration system (such as, e.g., a Racer Cloud), that may detect collocated access points reporting each other as RF neighbors. The system may determine the capabilities of each access point by inspecting the capabilities in the beacon and/or by inspecting their model information in the beacon.

The system may use this knowledge of the access point's capabilities to determine the distribution of standard power mode capable access points and/or standard power indoor power mode capable access points operating in the vicinity of LPI access points. Furthermore, sounding performed between IoT Wi-Fi devices may be performed to determine the potential RF proximity and signal cell overlap between these devices.

Process flow 600 may include determining permissible channels per access point 604. That is, based on the RF density information gathered in performing overlap detection 602, a set of permissible 6 GHz frequencies for each collocated access point may be evaluated. This evaluation may be performed on the basis of one or more criteria including a mode of operation 606 of each access point, an RF density compensated channel reuse 608 of each access point, AFC system determinations 610 for each access point, and/or power budget-based channel filtering 612 for each access point.

For example, determining permissible channels per access point 604 may include evaluating the permissible set of 6 GHz frequencies for an access point based on a mode of operation 606 of the access point. This evaluation may be used to identify potential channels available to the access point given its operating power mode and/or to identify modifications to the operating power mode of multi-power mode capable devices to alter their available channels.

If an access point is an outdoor device and/or has external antennas, then it may be permissible to operate the access point in standard power mode only and therefore will have limited number of frequencies allowed for Wi-Fi operation. Conversely, if an access point is indoors and/or has integrated antennas, then, based on the front-end-module capabilities, it may either operate in low power indoors power mode or in a standard power mode.

While some 6 GHz access points support low power indoors power mode only, a multi-power mode capable class may support both a low power indoors power mode and a standard power mode operation. The class of multi-power mode capable access points may be optimized (e.g., by switching power modes) for channel candidacy selection due to a wider range of allowed channels.

Additionally, determining permissible channels per access point 604 may include evaluating the permissible set of 6 GHz frequencies for an access point based on RF density compensated channel reuse 608 of the access point. This evaluation may be used to trim an allowed set of frequencies and/or identify permissible frequencies that will minimize cross-access point interference and access point channel changes considering the RF density between the access points and their bandwidth requirements.

Part of this evaluation may include determining a power mode for a multi-power mode capable access point. For multi-power mode capable access points, the density of nearby access points in the vicinity and/or their clients may be used to determine whether that access point can continue to operate in low power indoors power mode (e.g., to maximize channel availability) or should operate in standard power mode to benefit their clients at the cost of losing certain channels for operation.

This evaluation may include utilizing a channel reuse index (CR index) to influence the identification of permissible channels for an access point. For instance, a CR index may be calculated based on the RF density between the access points and their bandwidth requirements. For example, if access points are operating in sparse deployments, the total number of channels available when operating in a standard power mode may be enough to meet necessary channel reuse criteria. However, if set of indoor (or outdoor) access points operate under denser environment, the CR index may be biased towards a higher number. Similarly, if a majority of IT wireless devices associated with the access point require higher bandwidth for network operation, CR index may be adjusted higher.

Further, determining permissible channels per access point 604 may include evaluating the permissible set of 6 GHz frequencies for an access point based on AFC system determinations 610 for the access point. This evaluation may be used to trim an allowed set of frequencies and/or identify permissible frequencies that will minimize cross-access point interference and access point channel changes considering the AFC requirements for an access point.

As previously noted, for any access point to operate in standard power mode, it will need to have its proxy (e.g., a radio configuration system such as a Racer Cloud, etc.) connect with an AFC system in order to determine allowed channels and power budget. Therefore, evaluating the permissible set of 6 GHz frequencies for an access point based on AFC system determinations 610 may include using these AFC system determinations about the access points to further trim their allowed set of frequencies and/or identify permissible frequencies that comport with the AFC system requirements.

For example, any access point that will operate in standard power mode (e.g., either mandatory due to external/outdoor SKU or for coverage purposes) may be provided a list of allowed channels that is determined based on the AFC system outcome for that access point. The channel availability may be further modified based on the access point's geolocation and presence of any 6 GHz incumbents in the vicinity.

Furthermore, determining permissible channels per access point 604 may include evaluating the permissible set of 6 GHz frequencies for an access point based on power budget-based channel filtering 612 for the access point. This evaluation may be used to trim an allowed set of frequencies and/or identify permissible frequencies that will minimize cross-access point interference and access point channel changes considering the power budgets and/or power spectral density (PSD) limits for access points and/or potential channels.

For example, along with the channelization this evaluation may include evaluating the allowed power budgets and PSD limits on those frequencies for access points operating in power modes associated with mandated AFC control (e.g., operating in standard power mode). For the multi-power mode capable class of access points, part of this evaluation may include determining an operational power mode for the access point. For instance, if an allowed power budget from an AFC for an access point is less than or equal to 5 dBm/MHz then the access point's operation may be switched to low power indoors power mode. In this manner, not only will this access point maximize its channel reuse, but it can avoid daily updates and frequency constraints from the governing AFC system by avoiding the standard power mode operations associated with mandated AFC control.

Additionally, for SP access points that have allowed channels with a power budget less than or equal to 5 dBm/MHz, such channels can be deprioritized based on the CR index. This way, not only can the access point avoid further channel changes in the case of a coverage hole, but it will also allow nearby low power indoors power mode operated access points to enable channel reuse of those frequencies.

Process flow 600 may additionally include performing access point neighborhood classification 614 for each of the collocated access point. As described above, determining permissible channels per access point 604 may facilitate frequency segmentation for each access point. Using the information collected when determining permissible channels per access point 604, an RF neighborhood classification for each access point. The RF neighborhood may be classified based on the candidate access point being considered and/or its surrounding RF neighbors. Each access point may be classified as belonging to either a heterogeneous 6 GHz RF neighborhood classification 616 or as belonging to a uniform 6 GHz RF neighborhood classification 618. These classifications may be utilized to determine a final order of channel assignments to the collocated access points.

For example, if candidate access points have more than a threshold amount (e.g., a majority percentage, etc.) of its immediate RF neighbors operating in a different power mode than it is using, it may be classified as belonging to the heterogeneous 6 GHz RF neighborhood classification 616. This classification may apply to bordering access points in deployment environments such as warehouses and/or for access points at the edge of a building. For example, if a candidate access point is operating in a low power indoors power mode, then it may be classified as belonging to heterogeneous 6 GHz RF neighborhood classification 616 if its immediate RF neighbors are operating in a standard power mode. Likewise, if a candidate access point is operating in a standard power mode and its immediate RF neighbors are operating in a low power indoors power mode (e.g., outdoor access points near a factor, warehouse, etc., an external antenna access point located in a corridor, etc.), then it may be classified as belonging to heterogeneous 6 GHz RF neighborhood classification 616.

Alternatively, if a candidate access point and its immediate RF neighbors are operating under the same power mode, then the access point may be classified as belonging to the uniform 6 GHz RF neighborhood classification 618. For example, if a candidate access point is operating in a standard power mode and its immediate RF neighbors are also operating in a standard power mode (e.g., outdoor access points located further from a factory, warehouse, etc.), then it may be classified as belonging to the uniform 6 GHz RF neighborhood classification 618. Likewise, if a candidate access point is operating in a low power indoors power mode and its immediate RF neighbors are also operating in a low power indoors power mode (e.g., indoor access points located near the center of a factory, warehouse, etc.), then it may be classified as belonging to the uniform 6 GHz RF neighborhood classification 618.

Process flow 600 may additionally include performing final assignment and frequency segmentation 620 for each of the collocated access point. Performing final assignment and frequency segmentation 620 may include iterating over all SP access points and/or all LPI access points to assign optimal channel to a set of nodes within a localized RF neighborhood based on the filtered and/or permissible channels determined by determining permissible channels per access point 604.

Assignment of a channels to a particular access point may be prioritized based on the RF neighborhood classification for that access point. For example, in order to minimize channel changes in the system, candidate access points classified as belonging to heterogeneous 6 GHz RF neighborhood classification 616 may be prioritized in the channel assignment, followed by candidate access points classified as belonging to uniform 6 GHz RF neighborhood classification 618, and finally followed by IoT Radios in hotspot or sparse coverage (e.g., with minimal RF overlap). In the deployment scenario where a few bordering access points have overlap and their uniform neighbors have a higher CR index, then the channel assignment may be prioritized in the reverse order.

Figure 7:
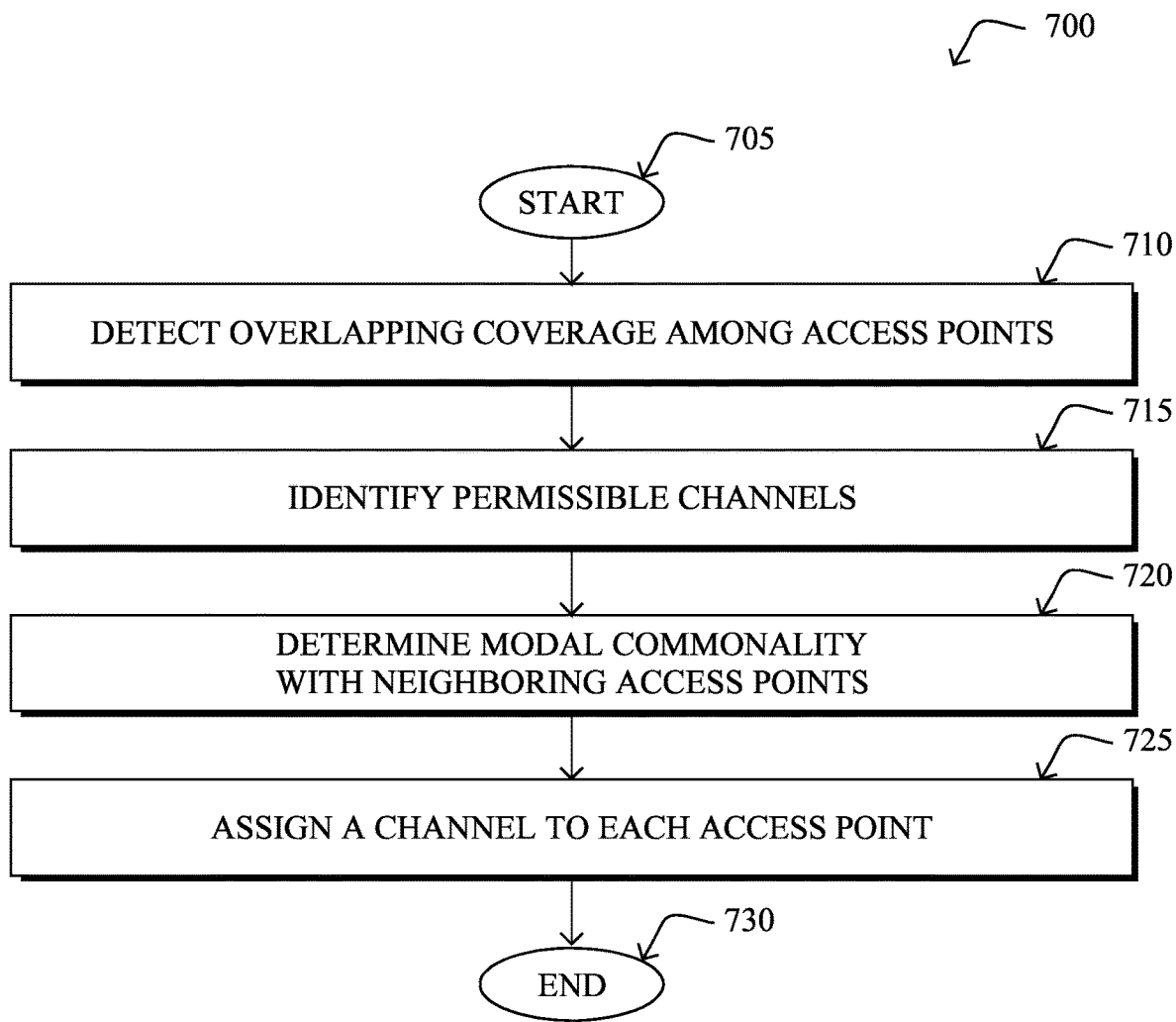
FIG. 7 illustrates an example simplified procedure for providing power-based channel assignments for overlapping access points.

FIG. 7 illustrates an example simplified procedure (e.g., a method) for providing channel assignments for overlapping access points, in accordance with one or more embodiments described herein. For example, a non-generic, specifically configured device (e.g., device 200), may perform procedure 700 by executing stored instructions (e.g., channel assignment process 249). The procedure 700 may start at step 705, and continues to step 710, where, as described in greater detail above, a device may detect overlapping coverage among a set of access points. Detecting the overlapping coverage among the set of access points may include detecting a set of collocated access points reporting each other as radio frequency (RF) neighbors.

Detecting overlapping coverage may include determining the RF density of collocated access points. The collocated access points may have some degree of differing power characteristic. The power characteristics associated with each access point of the set of access points may include characteristics indicative of an ability of that access point to operate in one or more of a standard power (SP) mode and a low power indoor (LPI) mode. The power characteristic associated with a particular access point of the set of access points may be determined by an inspection of data indicative of capabilities of the particular access point in a beacon sent by the particular access point.

In various embodiments, the collocated access points may be configured such that they are capable of operating in one or more of a standard power mode, low power indoors power mode, etc. For example, one or more of the collocated access points may be multi-power mode capable (e.g., dual-power mode capable, etc.) such that they are configured to be capable of switching between operating in the various power modes. This ability to switch among power modes may be utilized to shape the wireless transmission characteristics of a deployment on an access point-by-access point basis such that power-modes can be modified to optimize channel assignments in a way that leads to reduced channel changes and interference among access points of the deployment.

Additionally, detecting the overlapping coverage among the set of access points may comprise determining a spatial distribution of access points capable of operation in various power modes. Again, developing this spatial understanding of the access points operating in and/or capable of operating in various power modes may be used to shape the wireless transmission characteristics of a deployment on an access point-by-access point basis such that power-modes can be modified to optimize channel assignments in a way that leads to reduced channel changes and interference among access points of the deployment.

At step 715, as detailed above, the device may identify a permissible set of channels for each access point of the set of access points. This identification may be made based at least in part on power characteristics associated with each access point of the set of access points. Identifying the permissible set of channels may include filtering available channels based on an indication of allowed channels provided by a frequency coordination system. Therefore, the permissible set of channels may be a subset of channels broadly allowed (e.g., by an AFC system, by regulatory body, etc.) for use for an access point operating in a particular power mode. The subset may be operating frequencies, selected from among those allowed channels, that provide operational improvements to the access point such as reduced channel switching, reduced access point-to-access point interference, reduced regulatory (e.g., AFC system) involvement, etc.

Further, a power mode to be used by multi-power mode capable access points of the set of access points may be determined based on radio frequency (RF) density and bandwidth demands associated with the multi-power mode capable access points. Furthermore, a power mode to be used by multi-power mode capable access points of the set of access points may be determined based on at least one of a power budget or a power spectral density assigned to the multi-power mode capable access points by a frequency coordination system.

At step 720, as detailed above, the device may determine a level of modal commonality with neighboring access points for each access point of the set of access points. The level of modal commonality may be based on a heterogeneity and/or homogeneity between the power mode by which a candidate access point is operating and a power mode by which its immediate RF neighbors are operating. A level of modal commonality with neighboring access points for a particular access point of the set of access points may be determined from the spatial distribution of access points capable of operation in various power modes.

At step 725, as detailed above, the device may assign a channel to each access point of the set of access points based on the permissible set of channels and the level of modal commonality with neighboring access points for that access point. The assignment of a channel to an access point of the set of access points may with a heterogenous level of modal commonality with neighboring access points may be prioritized over assignment of the channel to an access point of the set of access points with a uniform level of modal commonality with neighboring access points.

Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce channel assignments for overlapping access points that enables segmenting 6 GHz frequencies based on the proximity of heterogeneous access points along with considerations from an automated frequency coordination (AFC) system to minimize frequent channel updates between bordering access points. As such these techniques provide AFC-aware channelization for collocated access points operating in different power modes, where overlap percentage between indoor and outdoor access points is detected in order to determine appropriate frequency segmentation between these different classes of devices.

Illustratively, the techniques described herein may be performed by hardware, software, and/or firmware, such as in accordance with the channel assignment process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the channel assignment process 248.

According to the embodiments herein, a illustrative method herein may comprise: detecting, by a device, overlapping coverage among a set of access points; identifying, by the device, a permissible set of channels for each access point of the set of access points based at least in part on power characteristics associated with each access point of the set of access points; determining, by the device, a level of modal commonality with neighboring access points for each access point of the set of access points; and assigning, by the device, a channel to each access point of the set of access points based on the permissible set of channels and the level of modal commonality with neighboring access points for that access point.

In one embodiment, detecting the overlapping coverage among the set of access points further comprises detecting a set of collocated access points reporting each other as radio frequency (RF) neighbors. In one embodiment, the method may further comprise: determining a power characteristic associated with a particular access point of the set of access points by an inspection of data indicative of capabilities of the particular access point in a beacon sent by the particular access point. In one embodiment, detecting the overlapping coverage among the set of access points further comprises determining a spatial distribution of access points capable of operation in various power modes.

In one embodiment, a level of modal commonality with neighboring access points for a particular access point of the set of access points is determined from the spatial distribution of access points capable of operation in various power modes relative to the particular access point of the set of access points. In one embodiment, the method may further comprise: determining a power mode to be used by multi-power mode capable access points of the set of access points based on radio frequency (RF) density and bandwidth demands associated with the multi-power mode capable access points. In one embodiment, identifying the permissible set of channels for each access point of the set of access points further comprises: filtering available channels based on an indication of allowed channels provided by a frequency coordination system.

In one embodiment, a method may further comprise: determining a power mode to be used by multi-power mode capable access points of the set of access points based on at least one of a power budget or a power spectral density assigned to the multi-power mode capable access points by a frequency coordination system. In one embodiment, wherein the power characteristics associated with each access point of the set of access points include characteristics indicative of an ability to operate in one or more of a standard power (SP) mode and a low power indoor (LPI) mode. In one embodiment, a method may further comprise: prioritizing assignment of a channel to an access point of the set of access points with a heterogenous level of modal commonality with neighboring access points over assignment of the channel to an access point of the set of access points with a uniform level of modal commonality with neighboring access points.

Further, according to the embodiments herein an illustrative apparatus herein may comprise: one or more network interfaces to communicate with a network; a processor coupled to the network interfaces and configured to execute one or more processes; and a memory configured to store a process that is executable by the processor, the process, when executed, configured to: detect overlapping coverage among a set of access points; identify a permissible set of channels for each access point of the set of access points based at least in part on power characteristics associated with each access point of the set of access points; determine a level of modal commonality with neighboring access points for each access point of the set of access points; and assign a channel to each access point of the set of access points based on the permissible set of channels and the level of modal commonality with neighboring access points for that access point.

According to the embodiments herein, an illustrative tangible, non-transitory, computer-readable medium herein may have computer-executable instructions stored thereon that, when executed by a processor on a computer, may cause the computer to detect overlapping coverage among a set of access points; identifying a permissible set of channels for each access point of the set of access points based at least in part on power characteristics associated with each access point of the set of access points; determining a level of modal commonality with neighboring access points for each access point of the set of access points; and assigning a channel to each access point of the set of access points based on the permissible set of channels and the level of modal commonality with neighboring access points for that access point.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments. Certain features that are described in this document in the context of separate embodiments can also be implemented in combination in a single embodiment. Conversely, various features that are described in the context of a single embodiment can also be implemented in multiple embodiments separately or in any suitable subcombination. Further, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
   detecting, by a device, overlapping coverage among a set of access points comprising indoor Wi-Fi access points and outdoor Wi-Fi access points;
   identifying, by the device, a permissible set of channels for each access point of the set of access points based at least in part on power characteristics associated with each access point of the set of access points;
   determining, by the device, a level of modal commonality with neighboring access points for each access point of the set of access points, wherein the level of modal commonality is determined based on heterogeneity and/or homogeneity between power modes by which candidate access points a operating and power modes which late radio frequency (RF) neighbor access points are operating; and
   assigning, by the device, a channel to each access point of the set of access points based on the permissible set of channels and the level of modal commonality with neighboring access points for that access point.

2. The method as in claim 1, wherein detecting the overlapping coverage among the set of access points further comprises detecting a set of collocated access points reporting each other as radio frequency (RF) neighbors.

3. The method as in claim 1, further comprising:
   determining a power characteristic associated with a particular access point of the set of access points by an inspection of data indicative of capabilities of the particular access point in a beacon sent by the particular access point.

4. The method as in claim 1, wherein detecting the overlapping coverage among the set of access points further comprises determining a spatial distribution of access points capable of operation in various power modes.

5. The method as in claim 4, wherein a level of modal commonality with neighboring access points for a particular access point of the set of access points is determined from the spatial distribution of access points capable of operation in various power modes.

6. The method as in claim 1, further comprising:
   determining a power mode to be used by multi-power mode capable access points of the set of access points based on radio frequency (RF) density and bandwidth demands associated with the multi-power mode capable access points.

7. The method as in claim 1, wherein identifying the permissible set of channels for each access point of the set of access points further comprises:
   filtering available channels based on an indication of allowed channels provided by a frequency coordination system.

8. The method as in claim 1, further comprising:
   determining a power mode to be used by multi-power mode capable access points of the set of access points based on at least one of a power budget or a power spectral density assigned to the multi-power mode capable access points by a frequency coordination system.

9. The method as in claim 1, wherein the power characteristics associated with each access point of the set of access points include characteristics indicative of an ability to operate in one or more of a standard power (SP) mode and a low power indoor (LPI) mode.

10. The method as in claim 1, further comprising:
    prioritizing assignment of a channel to an access point of the set of access points with a heterogenous level of modal commonality with neighboring access points over assignment of the channel to an access point of the set of access points with a uniform level of modal commonality with neighboring access points.

11. An apparatus, comprising:
one or more network interfaces;
a processor coupled to the one or more network interfaces and configured to execute one or more processes; and
a memory configured to store a process that is executable by the processor, the process when executed configured to:
  detect overlapping coverage among a set of access points comprising indoor Wi-Fi access points and outdoor Wi-Fi access points;
  identify a permissible set of channels for each access point of the set of access points based at least in part on power characteristics associated with each access point of the set of access points;
  determine a level of modal commonality with neighboring access points for each access point of the set of access points, wherein the level of modal commonality is determined based on heterogeneity and/or homogeneity between power modes by which candidate access points are operating and power modes by which immediate radio frequency (RF) neighbor access points are operating; and
  assign a channel to each access point of the set of access points based on the permissible set of channels and the level of modal commonality with neighboring access points for that access point.

12. The apparatus as in claim 11, wherein detecting the overlapping coverage among the set of access points further comprises detecting a set of collocated access points reporting each other as radio frequency (RF) neighbors.

13. The apparatus as in claim 11, wherein the process when executed is further configured to:
  determine a power characteristic associated with a particular access point of the set of access points by an inspection of data indicative of capabilities of the particular access point in a beacon sent by the particular access point.

14. The apparatus as in claim 11, wherein detecting the overlapping coverage among the set of access points further comprises determining a spatial distribution of access points capable of operation in various power modes.

15. The apparatus as in claim 14, wherein a level of modal commonality with neighboring access points for a particular access point of the set of access points is determined from the spatial distribution of access points capable of operation in various power modes relative to the particular access point of the set of access points.

16. The apparatus as in claim 11, wherein the process when executed is further configured to:
  determine a power mode to be used by multi-power mode capable access points of the set of access points based on radio frequency (RF) density and bandwidth demands associated with the multi-power mode capable access points.

17. The apparatus as in claim 11, wherein identifying the permissible set of channels for each access point of the set of access points further comprises:
  filtering available channels based on an indication of allowed channels provided by a frequency coordination system.

18. The apparatus as in claim 11, wherein the process when executed is further configured to:
  determine a power mode to be used by multi-power mode capable access points of the set of access points based on at least one of a power budget or a power spectral density assigned to the multi-power mode capable access points by a frequency coordination system.

19. The apparatus as in claim 11, wherein the power characteristics associated with each access point of the set of access points include characteristics indicative of an ability to operate in one or more of a standard power (SP) mode and a low power indoor (LPI) mode.

20. A tangible, non-transitory, computer-readable medium storing program instructions that cause a device to execute a process comprising:
  detecting overlapping coverage among a set of access points comprising indoor Wi-Fi access points and outdoor Wi-Fi access points;
  identifying a permissible set of channels for each access point of the set of access points based at least in part on power characteristics associated with each access point of the set of access points;
  determining a level of modal commonality with neighboring access points for each access point of the set of access points, wherein the level of modal commonality is determined based on heterogeneity and/or homogeneity between power modes by which candidate ac ss points are operating and power modes by which immediate radio frequency (RF) neighbor access points are operating; and
  assigning a channel to each access point of the set of access points based on the permissible set of channels and the level of modal commonality with neighboring access points for that access point.

* * * * *